(12) United States Patent
Tabanou et al.

(10) Patent No.: US 7,095,233 B1
(45) Date of Patent: Aug. 22, 2006

(54) SYSTEM, APPARATUS, AND METHOD OF CONDUCTING BOREHOLE RESISTIVITY MEASUREMENTS

(75) Inventors: Jacques R. Tabanou, Houston, TX (US); Christopher E. Morriss, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/185,048

(22) Filed: Jul. 20, 2005

(51) Int. Cl.
*G01V 3/20* (2006.01)
*G01V 3/00* (2006.01)
*G01V 3/18* (2006.01)

(52) U.S. Cl. .................. 324/369; 324/347; 324/356
(58) Field of Classification Search ............... 324/347, 324/356, 369
See application file for complete search history.

(56) References Cited

U.S. PATENT DOCUMENTS

| | | | |
|---|---|---|---|
| 5,574,371 A | | 11/1996 | Tabanou et al. |
| 5,720,355 A | * | 2/1998 | Lamine et al. ................ 175/27 |
| 5,883,515 A | * | 3/1999 | Strack et al. ................ 324/339 |
| 6,046,593 A | | 4/2000 | Eisenmann et al. |
| 6,359,438 B1 | | 3/2002 | Bittar |
| 6,369,575 B1 | | 4/2002 | Eisenmann et al. |
| 6,373,254 B1 | | 4/2002 | Dion et al. |
| 6,801,039 B1 | * | 10/2004 | Fabris et al. ................ 324/324 |
| 2005/0001624 A1 | | 1/2005 | Ritter et al. |

FOREIGN PATENT DOCUMENTS

GB    2 306 667    5/1997

OTHER PUBLICATIONS

S. Bonner et al., "A New Generation of Electrode Resistivity Measurements for Formation Evaluation," SPWLA 35th Annual Symposium, Jun. 19-22, 1994.

* cited by examiner

*Primary Examiner*—Bot LeDynh
(74) *Attorney, Agent, or Firm*—Alberto Amatong; Bryan L. White; Victor H. Segura

(57) ABSTRACT

A logging-while-drilling tool is adapted for incorporation with a drill string having a longitudinal axis. The drill string is further adapted for drilling a wellbore penetrating a geological formation. The drilling tool includes a tool body having a central axis disposed in parallel relation with the longitudinal axis of the drill string and an external, circumferential surface spaced radially outward from the central axis. The tool also includes a measurement apparatus for measuring resistivity of a borehole fluid in the wellbore. The measurement apparatus has an electrode array including a current emitting electrode disposed on the circumferential surface. The current emitting electrode is adapted to emit current into a target region of the wellbore spaced laterally between the circumferential surface and the walls of the wellbore. Further, a current receiving electrode is disposed on the circumferential surface and spaced apart from the current emitting electrode. The current receiving electrode is adapted to receive current propagated from the current emitting electrode into the target region. The electrode array occupies an arcuate section of the circumferential surface that extends less than about 180° about the central axis.

24 Claims, 8 Drawing Sheets

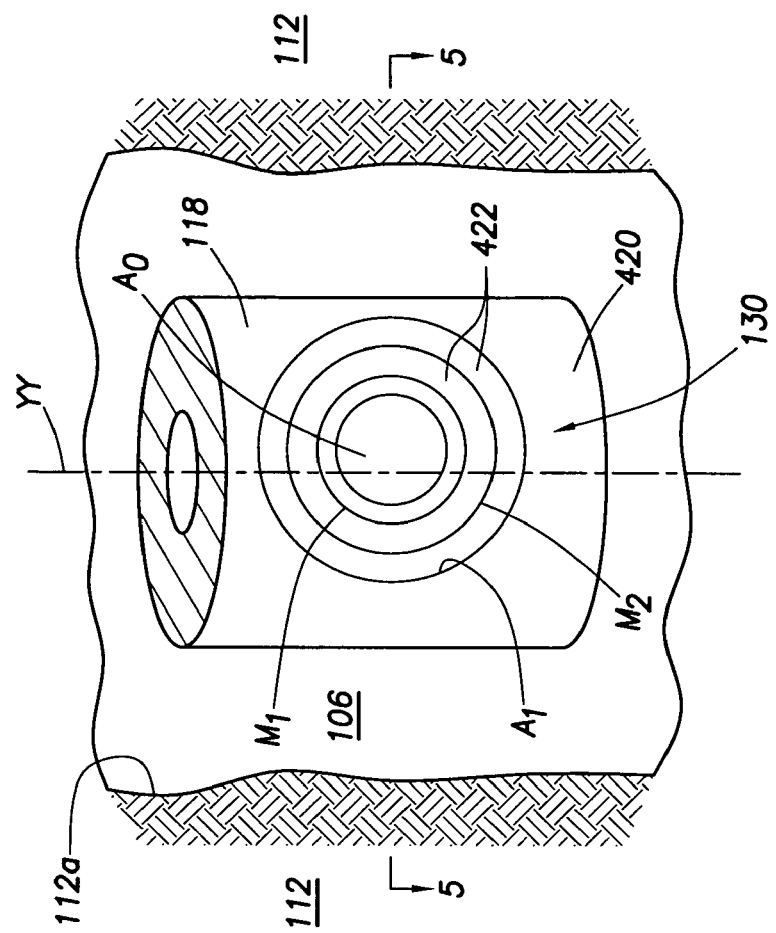
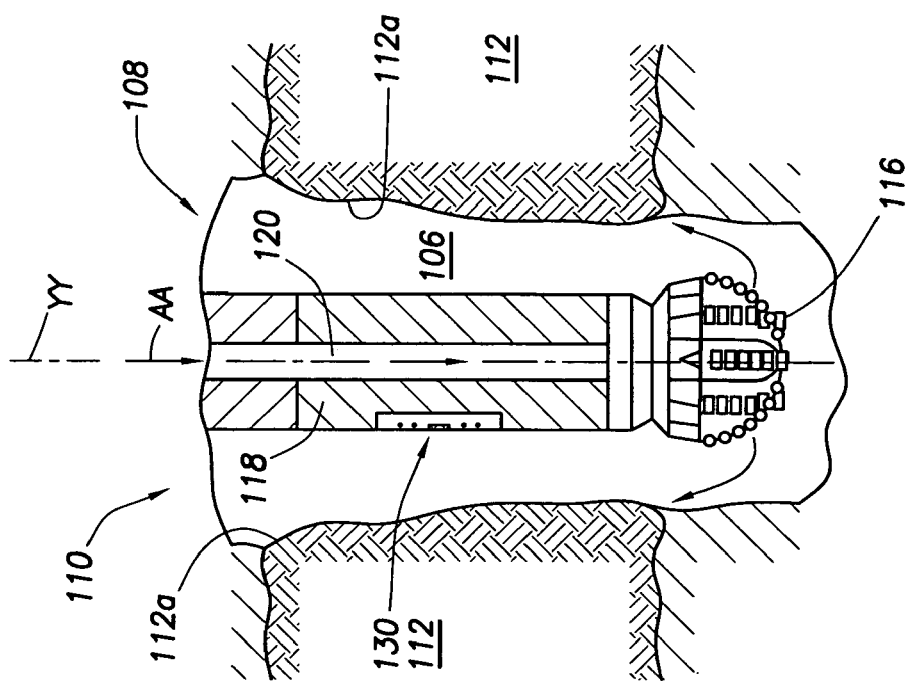

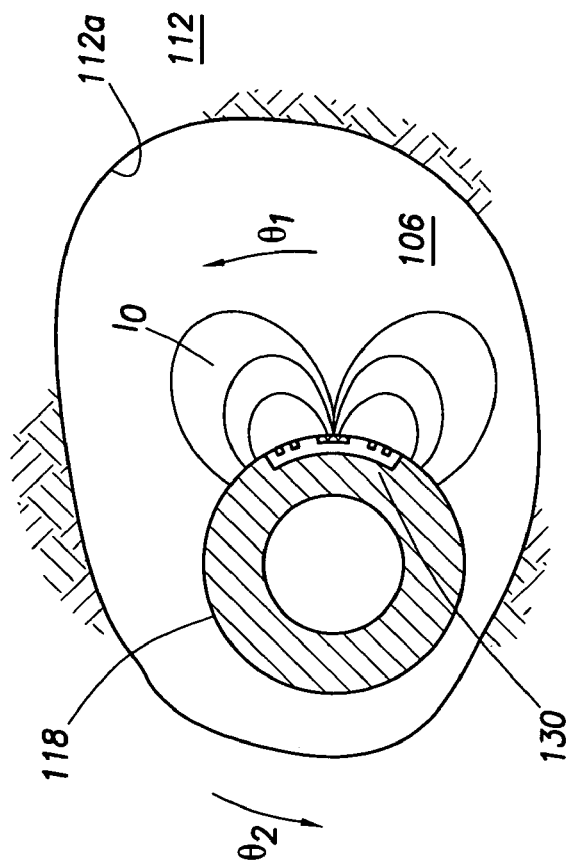
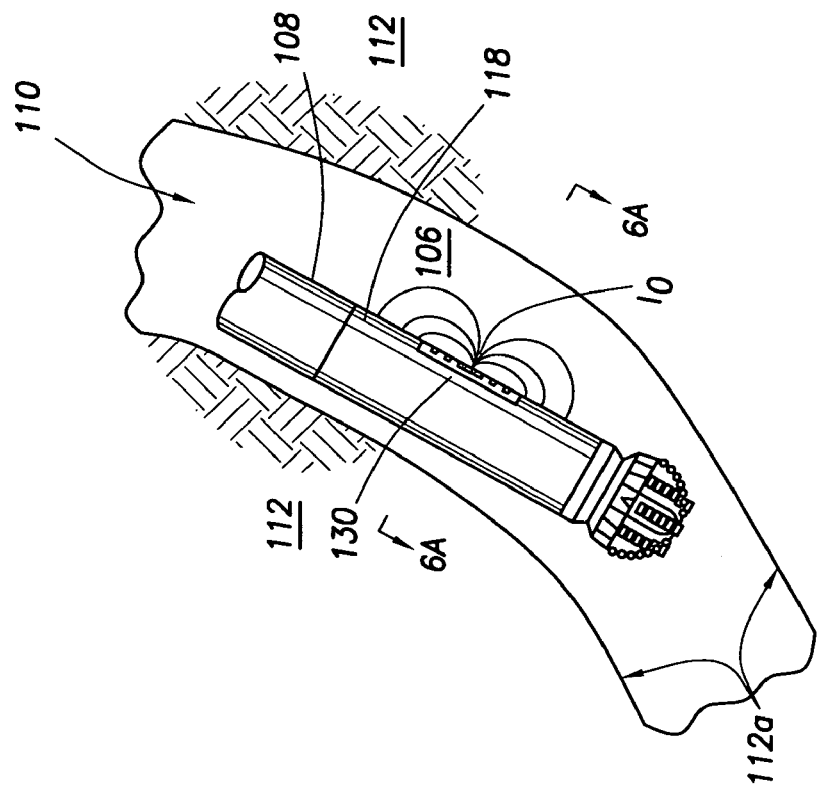
FIG. 6A
FIG. 6

SYSTEM, APPARATUS, AND METHOD OF CONDUCTING BOREHOLE RESISTIVITY MEASUREMENTS

BACKGROUND

The present invention relates generally to the drilling and exploration of a geological formation for the ultimate purpose of extracting hydrocarbons therefrom. More particularly, the invention relates to a system, apparatus, and method of conducting measurements from a wellbore or borehole penetrating the formation. The inventive system, apparatus, and method described herein are particularly suited for measuring a resistivity of a conductive formation fluid or mud in the borehole.

Formation fluids typically enter the borehole when the pressure in the formation exceeds the hydrostatic pressure. If the pressure differential is relatively large, the influx of formation fluids may be uncontrollable. This presents a danger of a well "blowout, which is of particular concern when the formation fluids include flammable hydrocarbons. Moreover, considerable expense is incurred in addressing the unsafe condition and restoring the well to a stable, and then operable condition. It is, therefore, desirable to monitor the borehole for such influx.

The resistivity of the formation fluid (i.e., oil, gas, and water) is typically different from that of the drilling fluid. Accordingly, measurement of borehole fluid resistivity during drilling allows for possible detection of a change in resistivity corresponding to an influx of formation fluids. Early detection provides time for corrective action to be taken. Corrective action entails mechanically sealing the well to prevent the escape of the formation fluids and/or increasing the weight of the drilling fluid by adding weighting material.

Borehole fluid resistivity measurements are also used in evaluating the geological formation adjacent the borehole. Typically, a geological formation that contains hydrocarbon has a higher resistivity than a formation that contains water. In a known method of detecting hydrocarbon-bearing formations, sensors adapted to measure resistivity of the formation are incorporated into the drilling apparatus so as to provide a continuous recording of formation resistivity during drilling. The sensors are designed to measure the resistivity of the formation; but are also affected by the resistivity of the fluid content of the borehole ("borehole fluids"). Accordingly, techniques are employed to correct formation resistivity measurements due to the influence of borehole fluid resistivity. Referred to as "borehole correction" methods, these methods require an estimate of the resistivity of the fluid entering the borehole. This estimate of borehole fluid resistivity may be obtained from knowledge of the chemical composition of the drilling fluids. Alternatively, this estimate may be obtained by measuring, at the surface, the resistivity of a sample of the drilling fluid taken from the borehole.

Borehole fluid resistivity sensors are included in some wireline logging tools. An example of such prior art borehole fluid resistivity sensors is described in U.S. Pat. No. 5,574,371, which has been assigned to the Assignee of the present application. The disclosure of the '371 patent serves as a good source of background information for the present invention. To facilitate the description of the present invention and to further highlight the present invention's contribution to the current art, the '371 patent is hereby incorporated by reference for all purposes and made a part of the present disclosure.

FIG. 1 provides one example of a prior art well logging apparatus used in measuring borehole fluid resistivity for borehole correction methods. Specifically, FIG. 1 provides an illustration of a prior art Auxiliary Measurement Sub (AMS sub) that is connected to a top of a well logging apparatus tool string, as originally disclosed in U.S. Pat. No. 5,157,605 to Chandler, et al. (which is also hereby incorporated by reference for all purposes and made a part of the present disclosure). The AMS sub includes a sub body 10 disposed in a wellbore 12 and defining an annular space 14 between the sub body 10 and a wall 16 of a formation penetrated by the wellbore 12. A multiple pin connector head 17 (typically, a 31 pin head) is connected to a top of the body 10 and another multiple pin connector head 19 is connected to a bottom of the body 10. The heads 17 and 19, which must withstand a high mud external pressure, are each very expensive to manufacture, costing about ten thousand dollars each. A conductive mud 18 is disposed within the annular space 14. The sub body 10 includes a recess 20 which is inwardly disposed relative to an outer wall of the sub body 10. A set of electrodes $A_1$, $M_1$, $M_2$, and $A_2$ are disposed within the recess 20. The electrode $A_1$, called a current emitting electrode, is adapted to emit a current into the conductive mud 18, the current propagating through the mud 18 and being received by the electrode $A_2$, called a current receiving electrode. The electrodes $M_1$ and $M_2$, called measurement electrodes, are disposed between the $A_1$ electrode and the $A_2$ electrode and measure a voltage potential drop which exists in a region 23 which is enclosed by a pair of equipotential lines 21, the region 23 including the conductive mud 18 in the wellbore 12 and formation penetrated by the wellbore 12. The voltage potential drop in region 23 of FIG. 1 is supposed to be representative of a resistivity (Rm) of only the conductive mud 18 in the annular space 14. However, a problem exists: the voltage potential drop in region 23 of FIG. 1 is actually representative of the resistivity of both the mud 18 and the formation penetrated by the wellbore 12. In order to avoid this problem, in FIG. 1, the AMS sub was purposely manufactured with the recess 20 so that the electrodes $A_1$, $M_1$, $M_2$ and $A_2$ could be placed within that recess 20. The reason for the recess 20 is as follows. When the electrodes were placed on the outer wall 10a of the sub body 10, the current being emitted from the current emitting electrode $A_1$ would cross an interface (wall 16) which exists between the conductive mud 18 and the formation penetrated by the wellbore 12 thereby adversely affecting the accuracy of the measurement of the resistivity (Rm) of the conductive mud 18. When the electrodes $A_1$, $M_1$, $M_2$, and $A_2$ are placed in the recess 20, a much smaller quantity of the current, being emitted from the emitting electrode $A_1$, is able to cross the interface 16 between the mud 18 and the formation. Consequently, that part of the voltage potential drop in region 23 resultant from the current flowing in the formation penetrated by the wellbore 12 was reduced; and, as a result, the adverse effect of the measurement of the resistivity (Rm) of the mud 18 in the wellbore 12 was reduced. However, as shown in FIG. 1, some current 22, called "crossing current" 22, from the emitting electrode $A_1$ still crosses the interface 16 and flows in the formation penetrated by the wellbore. As a result, the voltage potential drop in region 23 of FIG. 1 enclosed by the pair of equipotential lines 21 and measured by the measurement electrodes $M_1$ and $M_2$ still includes both the potential drop of the conductive mud 18 and the potential drop in the formation penetrated by the wellbore 12. Therefore, when using the AMS sub of FIG. 1, the adverse effect of the crossing current 22 on the mud resistivity (Rm) measurement still exists and, as a result, the mud resistivity measurement is not as accurate as desired.

The specification of the '371 patent describes a prior art measurement probe 26 for measuring borehole fluid resistivity that is disposed adjacent the bottom of a wireline tool string, as shown in FIG. 2. The measurement probe 26 includes a current emitting electrode $A_0$, and measurement electrodes $M_1$, $M_2$, and current receiving electrode $A_1$. In operation, current $I_0$ emitted by the emitting electrode, $A_0$, is propagated from the electrode array in a downhole direction 24c that is approximately parallel to the longitudinal axis 24b of the probe 26 (and the wellbore). The current $I_0$ is therefore directed into the wellbore space below the wireline tool as opposed to the direction of the formation. In this way, some of the problems of the above-mentioned prior art, as disclosed in the '605 patent and/or illustrated by FIG. 1, are addressed. Specifically, the "crossing currents" and thus the influence of the formation on the borehole fluid resistivity measurements are reduced or eliminated.

BRIEF DESCRIPTION OF THE DRAWINGS

A full understanding of the present invention will be obtained from the Detailed Description provided below and/or the accompanying drawings, which are given by way of illustration only and are not intended to limit the scope of the present invention, and wherein:

FIG. 3 is a simplified diagram of a drilling apparatus situated in a wellbore and incorporating a measurement system, according to the present invention;

FIG. 4 is a detailed section of the measurement system in FIG. 3;

FIG. 6 is a simplified illustration of the drilling apparatus in FIG. 3 operating about a deviated borehole;

FIG. 6A is a cross-sectional view through line 6A–6A in FIG. 6;

SUMMARY OF THE INVENTION

Figure 2:
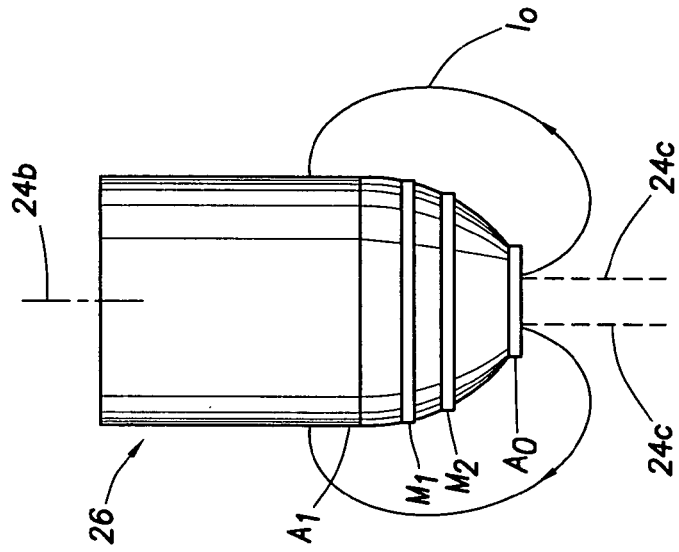
FIG. 2 is a simplified illustration of a prior art electrode array on a resistivity logging tool.
Figure 1:
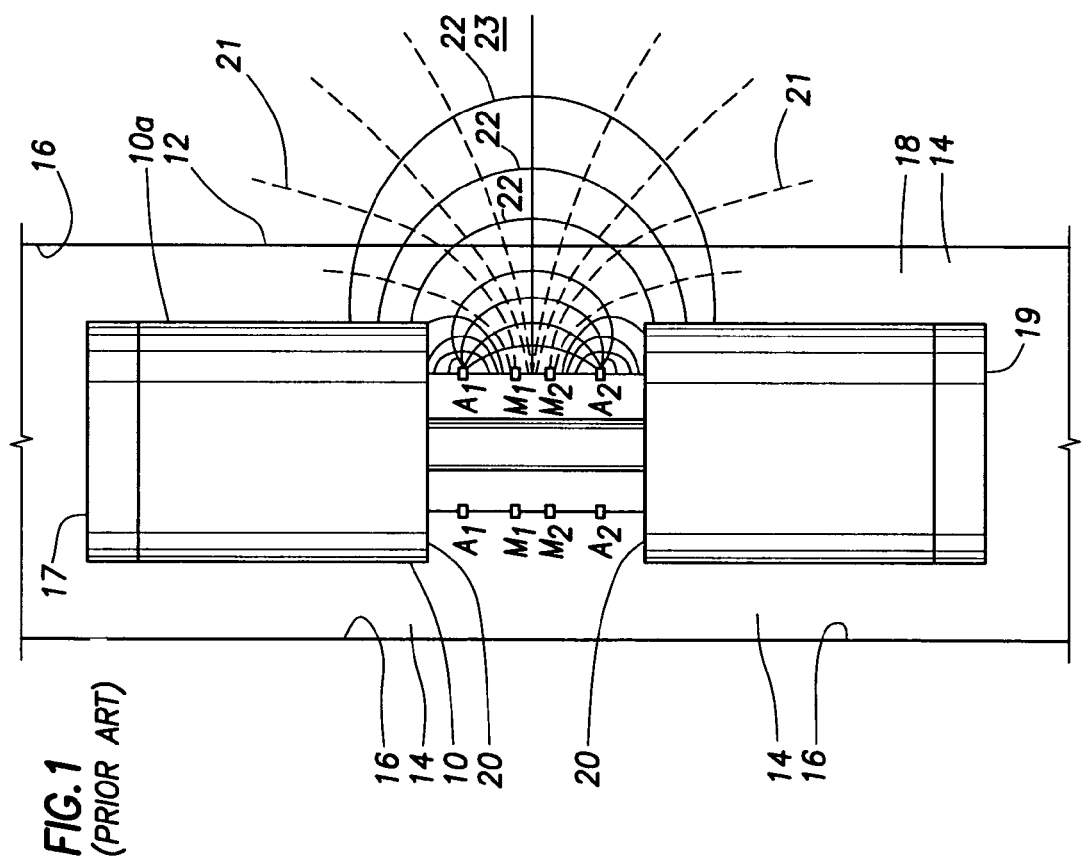
FIG. 1 is a simplified illustration of a prior art induction logging apparatus operable to conduct resistivity measurements.

In one aspect of the invention, a logging-while-drilling tool is provided that is adapted for incorporation with a drill string. The drill string has a longitudinal axis and is further adapted for drilling of a wellbore penetrating a geological formation, wherein the wellbore has an all-around wall. The inventive drilling tool has a tool body with a central axis disposed in generally parallel relation with the longitudinal axis of the drill string and a circumferential surface spaced radially outward from the central axis. The tool also includes a measurement apparatus for measuring resistivity of a borehole fluid in the wellbore. The measurement apparatus has an electrode array including a current emitting electrode disposed on the circumferential surface. This current emitting electrode is adapted to emit current into a target region of the wellbore spaced laterally between the circumferential surface and the walls of the wellbore. Further, the tool has a current receiving electrode disposed on the circumferential surface and spaced apart from the current emitting electrode. This current receiving electrode is adapted to receive current propagated from the current emitting electrode into the target region.

In accordance with the present invention, the electrode array occupies an arcuate section of the circumferential surface (i.e., less than full circle or less than 360° abut the central axis). Preferably, the arcuate section extends (i.e., a circumferential span) less than about 180°, more preferably, less than about 45°–90°, and most preferably, less than about 30° about the central axis. In one preferred embodiment, the arcuate section extends between 15°–20° about the central axis.

In another aspect of the present invention, a method is provided for measuring a resistivity of borehole fluid in a wellbore during drilling of the wellbore. The method entails lowering a measurement apparatus into the wellbore along with a drilling apparatus. This measurement apparatus includes a generally longitudinally extending circumferential surface, a current emitting electrode disposed on the circumferential surface, and a current receiving electrode disposed on the circumferential surface and spaced apart from the current emitting electrode. The current receiving electrode is adapted to receive current propagated from the current emitting electrode. An electrode array, therefore, includes the current electrodes and occupies an arcuate section (preferably extending less about than 30° about the central axis) of the circumferential surface. During drilling, a current is emitted from the current emitting electrode into a target region that is spaced laterally between the wall of the wellbore and the circumferential surface. Also during drilling, a current emitted by the current emitting electrode into the target region is received at the current receiving electrode. The target region that is traversed by this emitted current extends less than 360° about the central axis. Furthermore, a measurement is made during drilling of a voltage difference that is reflective of the resistivity of borehole fluid in the target region.

Preferably, the measurement apparatus is rotated in the wellbore through a range of 360°. Accordingly, the emitting, receiving, and measuring steps are repeated a plurality of times during this 360° rotation. In this way, measurements are generated that correspond to a plurality of angular tool positions.

In yet another aspect of the present invention, a measurement apparatus is provided for measuring a resistivity of borehole fluid in a target region of a wellbore. The inventive measurement apparatus includes a tool body having a central axis disposed in generally parallel relation with a longitudinal axis of the wellbore, when the tool body is lowered into the wellbore. The tool body has an external, circumferential surface that is spaced radially outward from the central axis. The measurement apparatus also includes a current emitting electrode disposed on the circumferential surface. The current emitting electrode is adapted to emit current into the target region spaced laterally between the circumferential surface and the wall of the borehole. The measurement apparatus further includes a current receiving electrode that is disposed on the circumferential surface and is spaced apart from the current emitting electrode. The current receiving electrode is adapted to receive current propagated from the current emitting electrode into the target region. The electrodes are configured such that a circumferential span between the electrodes and the direction of a current generated between the two electrodes extends less than about 180° about the central axis. Preferably, the arcuate section extends less than about 90° about the central axis, and more preferably, less than about 30° to 45° about the central axis, and most preferably less than about 20° about the central axis.

DETAILED DESCRIPTION

The present invention is particularly suited for use with a logging-while-drilling (LWD) tool or apparatus. FIGS. 3–9 depict LWD tools embodying various aspects of the invention. It should be noted, however, that the measurement system and drilling tool illustrated in the Figures and/or described herein are provided to illustrate exemplary applications of the invention. It will become apparent to one generally skilled in the relevant petrophysical, mechanical, electrical, and other relevant art, upon a viewing of the present disclosure, that various aspects of the invention are applicable to other types of wellbore tools (e.g., wireline and coil tubing tools) and other structures and other configurations. The present invention should not, therefore, be limited to the specific structures and methods described herein.

Referring to FIG. 3, a section of a drill string 108 is depicted situated in a wellbore 110 penetrating a geological formation 112 of interest. The section of drill string 108 is shown spaced inwardly from an all-around wall 112a of the formation 112, thereby defining a region or annulus gap 106 spaced laterally between the drill string 108 and the borehole wall 112a. The section of drill string 108 includes a drill bit 116 positioned at a bottom or forward end and a logging-while-drilling apparatus represented by a tool body or drill collar 118 positioned adjacent and above the drill bit 116. The drill string 108 further includes a longitudinally-extending central annulus 120 and a longitudinally-extending central axis YY. The annulus 120 functions primarily to communicate drilling fluid "AA" downward in the annulus 120 and into the wellbore 110.

As used herein, the terms "borehole fluid", "formation fluids in the wellbore", and "mud" all refer to the fluids found in the wellbore 110 and more specifically the medium in the annulus gap 120 targeted for resistivity measurement. In practice, the fluid inside the wellbore 110 during drilling is mostly mud with traces of formation fluid contained in the rock fragments produced by the drilling of the rock formations.

In accordance with the present invention, a system 130 for measuring borehole fluid resistivity is incorporated with the logging-while-drilling (LWD) tool 118. The measurement system 130 is therefore adapted to continuously conduct measurements during drilling of the wellbore 110.

Referring to the more detailed sectional view of the drill collar 118 provided in FIG. 4, the measurement system 130 is installed on or about a circumferential surface 420 of the drill collar 118. The circumferential surface 420 is defined by the diameter of the drill collar 118 and/or a circumference disposed about the central axis YY. The measurement system 130 includes an electrode array provided by an arrangement of current and voltage electrodes. As further illustrated by the exaggerated (not-to-scale) cross-sectional view of FIG. 5, the electrodes of the array are preferably installed generally flush and recessed about the circumferential surface 420. The electrode array includes a centrally-positioned current emitting electrode $A_0$. Positioned about and spaced radially outward from the central current emitting electrode $A_0$ is a circular or ring-shaped electrode $M_1$. A second circular or ring-shaped voltage electrode $M_2$ is positioned about voltage electrode $M_1$ and as well, spaced radially outward therefrom. As further shown in FIG. 5, the electrodes $A_0$, $M_1$, and $M_2$ are concentrated in a localized arcuate section θ of the circumferential surface 420 and face radially outward in the direction of the borehole wall 112a. Between these electrodes, the space or gap is filled with an insulating, nonconductive material 422. In each of the embodiments, sufficient insulation is maintained between the electrodes so as to minimize the effect of current leakage on the overall accuracy of the measurements. As denoted in the Figures and discussed further below, the conductive body of the drill collar 118, and more specifically, its outer surface 420 functions as a second or current receiving electrode $A_1$.

Figure 4B:
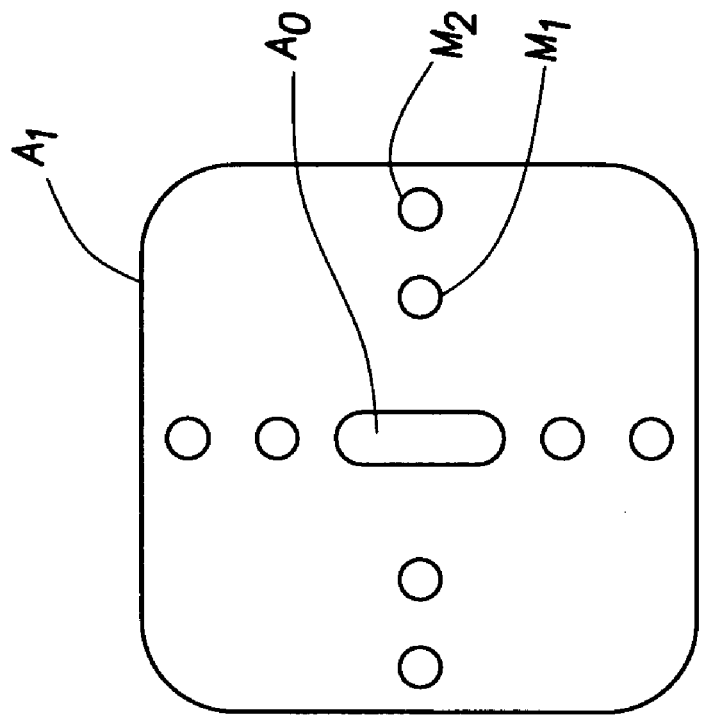
FIG. 4B is a simplified diagram of an alternative arrangement for an electrode array of a measurement system, according to the present invention.
Figure 4A:
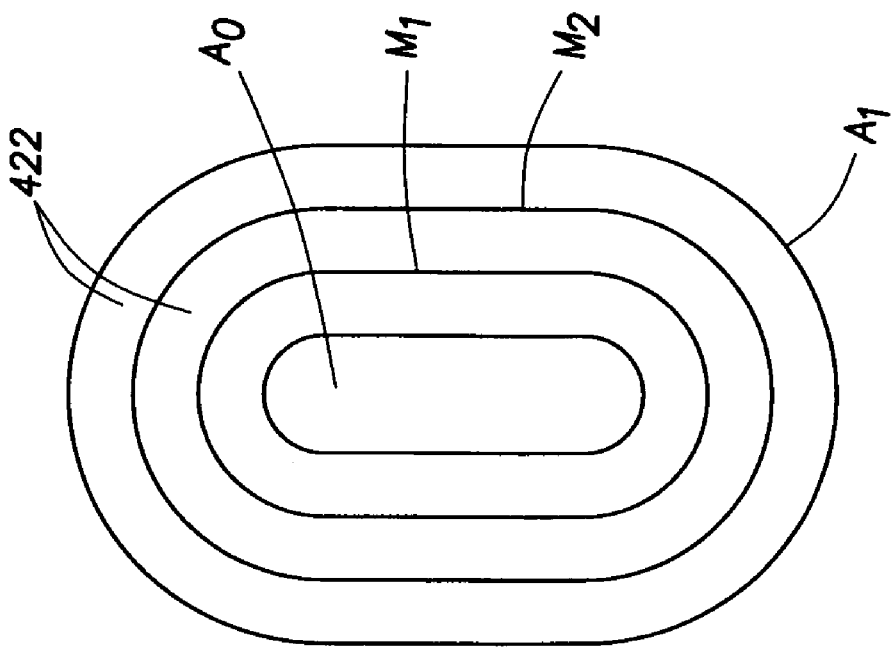
FIG. 4A is a simplified diagram of an alternative arrangement for an electrode array of a measurement system, according to the present invention.
Figure 5:
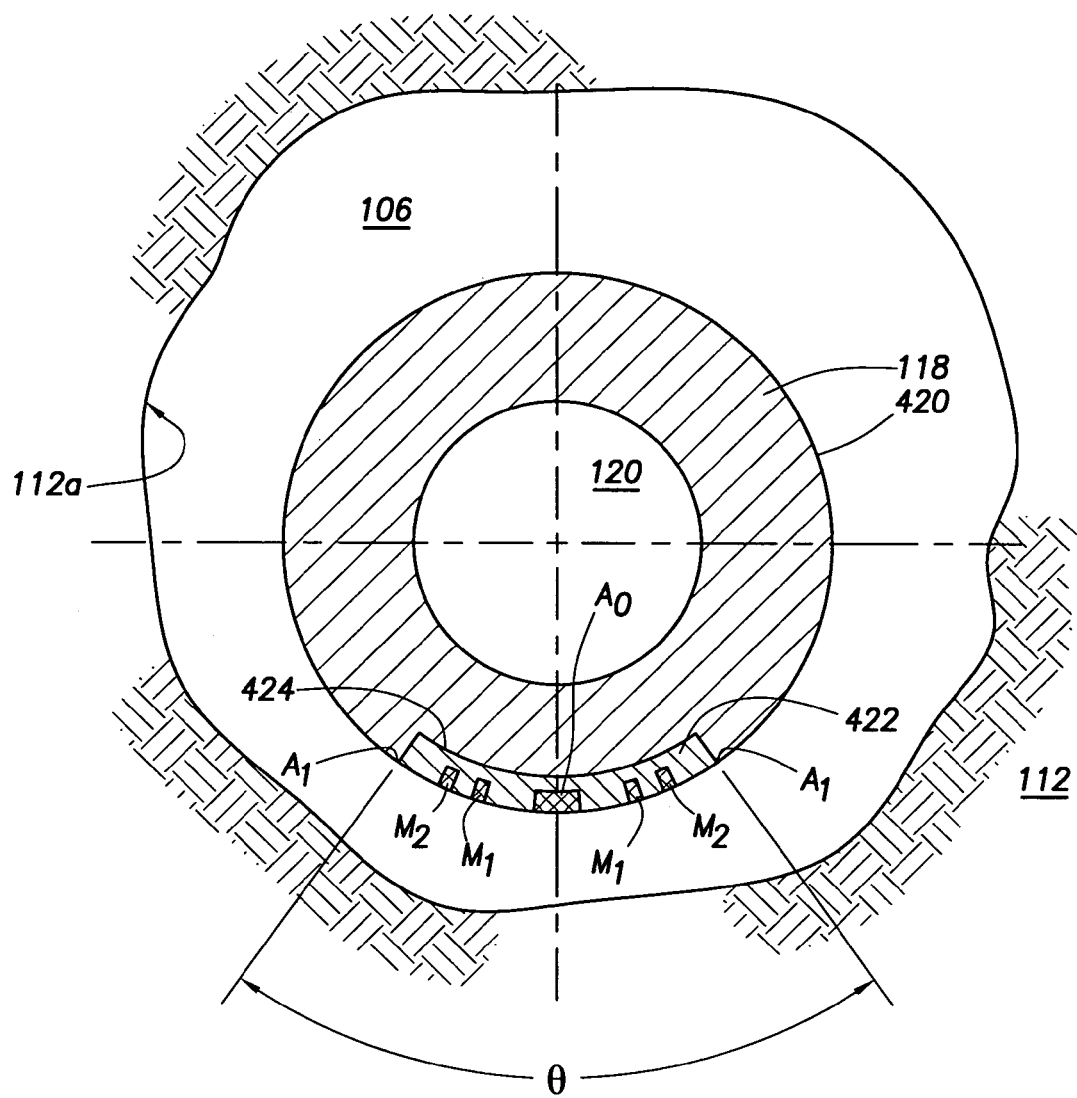
FIG. 5 is a lateral cross sectional view of the measurement system in FIG. 4.

Referring to FIGS. 4 and 5, the current emitting electrode $A_0$ is preferably a button or disc shaped member embedded in the circumferential surface 420. The voltage electrodes $M_1$ and $M_2$ of the embodiment in the Figures are ring-shaped members similarly embedded in the circumferential surface 420. In accordance with the invention, to minimize the effect of borehole size and formation resistivity, and promote reliability, the electrode array comprises electrodes $A_0$, $M_1$, and $M_2$, which are as small as practical and slightly recessed from the outside surface 420. Preferably, a recess 424 is provided in the circumferential surface 420 along the predetermined arcuate span θ.

Figure 5A:
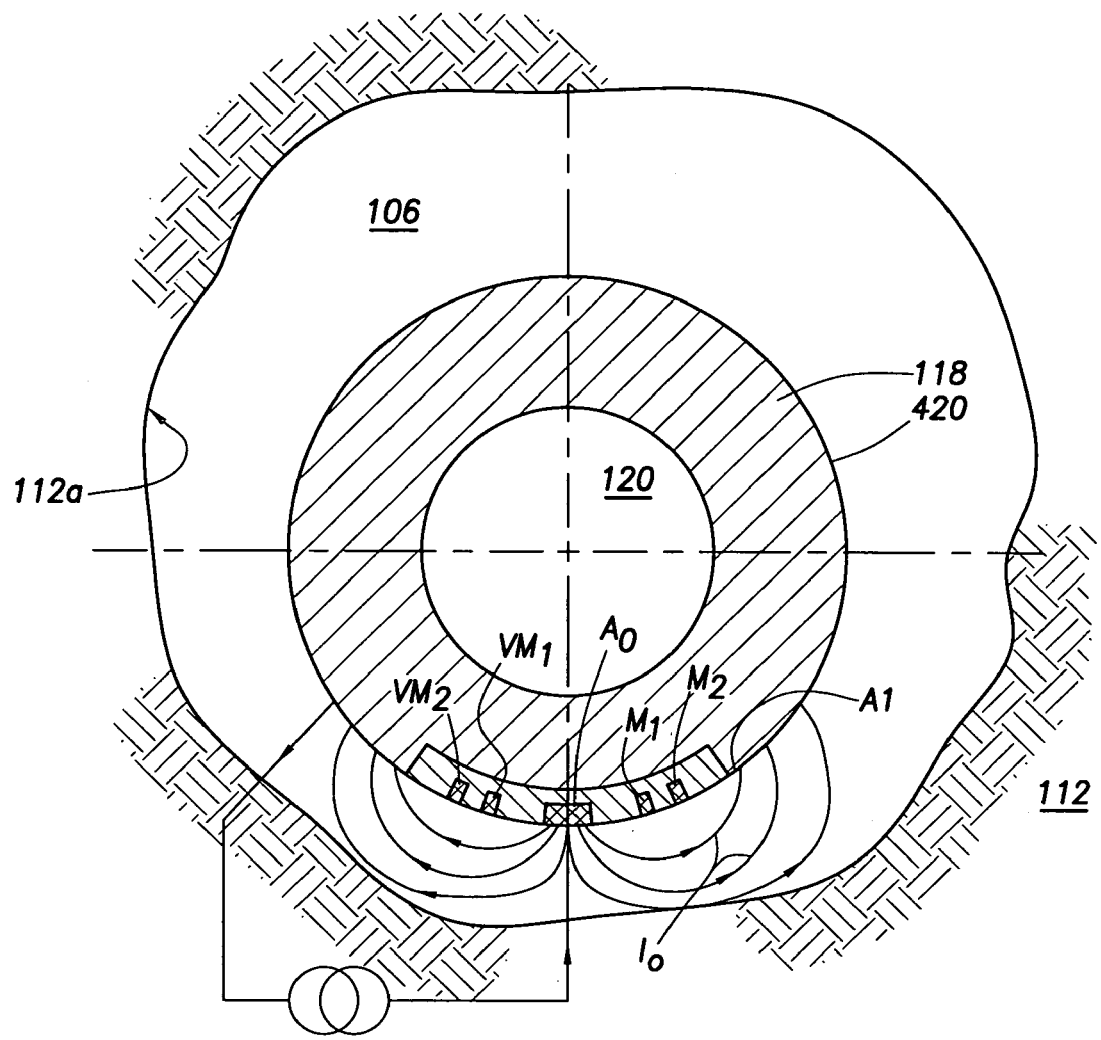
FIG. 5A is a functional illustration of the measurement system of FIG. 5, according to the present invention.

As depicted in FIG. 5A, current, $I_0$, is emitted from current electrode $A_0$, toward the annulus gap 106 (which is the targeted region for measurement), and returns to and is received by electrode $A_1$, which in this case is provided by the drill collar 118. In passing through the annulus gap 106, the current, $I_0$, passes through conductive formation fluids or mud situated therein. Then, the voltage difference, ΔV, is measured between the two voltage electrodes $M_1$, $M_2$, and the apparent borehole fluid resistivity ($R_m$) is estimated by the following equation:

$$R_m = K(VM1 - VM2)/I_0,$$

where, $I_0$ is the measured current emitted by $A_0$, ($VM_1 - VM_2$) is the voltage difference, ΔV, measured between voltage electrodes $M_1$ and $M_2$; and K is a calibration constant that allows conversion from resistance in ohms to resistivity in ohm-meters.

In the particular embodiment depicted in FIGS. 3–5, electrodes $M_1$ and $M_2$ are preferably circular in shape as is the inner edge of $A_1$ (which is provided by drill collar 118). It will be apparent to one skilled in the art that other shapes may be used without departing from the present invention. Due to the absence of sharp angles, the circular shape is less costly to manufacture. Electrodes of this shape also reduce or eliminate stress concentrations inherent in other shapes and thus, are more reliable in the drilling environment (because it reduces stress imbalance on the insulting part). Other shapes may be used, however, including oval shapes and non-looped shapes wherein the electrodes may be spaced-apart generally vertically or horizontally. For example, the voltage electrodes $M_1$ and $M_2$ may be button or rod-shaped. FIGS. 4A and 4B provide alternate shapes that could be used as well. In FIG. 4A, the electrode array provides an oval-shaped arrangement. In FIG. 4B, electrodes $M_1$ and $M_2$ are button-type electrodes.

As used herein, the term "arcuate section" shall mean a section of a circumferential surface that extends (e.g., as viewed from the top or bottom of the drill string or wellbore) less than full circle about a central, longitudinal axis (e.g., less than 360°). Further, an "arcuate span" shall mean the degree or extent that the arcuate section extends about or around the central axis, as measured in degrees or equivalent.

As used herein, the term "circumferential surface" shall mean an all-around, externally facing surface defined, at least partially, by a circumference of a body having a central axis. The circumferential surface is similarly defined by the radius or diameter of the body.

In the embodiment shown of the measurement system 130 or, more specifically, the electrode array of the present invention, is that the electrodes are concentrated in the one arcuate section θ of the circumferential surface 422 of the drill collar 118. Such an arrangement departs from the conventional circumferential electrodes that traverse the full circumference of the drilling tool. A circumferential span of this arcuate section as projected on a plane perpendicular to the longitudinal axis of the tool 118 traverses about the longitudinal axis less than full circle. When the electrodes are arranged generally vertically, the circumferential span is further reduced. As described below, reduction of this circumferential span translates to a reduced extent of the region about and spaced laterally from the tool 118 that is targeted for resistivity measurements at any give time and depth in the wellbore (i.e., target region).

In one preferred arrangement of the electrode array, the diameter of the tool 118 is 6¾" and the arcuate span, θ, is preferably about 16–18°. Accordingly, the overall corresponding circumferential span or arc length (from $A_1$ to $A_1$) is about 1". This provides that the electrode $A_0$ is about 0.3" to 0.4" in diameter, and the distance between $A_0$ and $M_1$ is about 0.35" to 0.030". Such small dimensions provide a practical compromise between all of the design requirements of the electrode array. Generally, the smaller that the overall dimension is, the more shallow that the resistivity measurements will be and the less likely it will be affected by the formation resistivity (i.e., less likely that a substantial amount of the emitted current will travel into the formation). On the other hand, the reliability of the electrode array under harsh drilling conditions is increased by increasing the thickness of the insulating material placed between the electrodes (which increases the array dimensions).

By limiting the electrode array to an arcuate section or span $θ_0$ (θ~16–18° or 15°–20°, as opposed to disposing the array all the way around the tool (360°), for example), azimuthal measurements, may be made as the drill collar is rotated. Azimuthal measurements are particularly advantageous when the drill collar 118 is eccentered in the wellbore 110. Although the propagation of current 10 from the emitting electrode $A_0$ may be directed through the annulus gap 106 and toward the borehole wall 112a, and thereby, influenced by the resistivity of the formation 112, operation of the inventive measurement system and method allows for such formation-influenced readings to be readily identified and disregarded.

To illustrate, FIG. 6 depicts the same drilling tool 118 being maneuvered about a deviated portion of the wellbore 110 (i.e., directional drilling). At this position or well depth, the drilling tool 118 is eccentered in the wellbore 112. Through rotation of the drill string 108, the measurement system 130 is positioned, at various times, at angular positions θ proximal or furthest from the borehole wall 112a. In the cross sectional view of FIG. 6A, the measurement system 130 is positioned at angular position θ (maximum separation or distance), and about 180° from the portion of the circumferential surface 420 that is proximate the borehole wall 112a. The emitting current is thus directed across the annulus gap 106 and into a region possibly occupied by the subject borehole fluid. The resulting measurements are likely to be unaffected by the formation 112 and thus more accurate. Upon 180° rotation, the electrode array will be positioned at $θ_2$ and proximate the borehole wall 114 (minimum distance or separation). At this orientation or angular position $θ_2$, the emitted current lines, $I_0$, is likely to be directed into the formation 112 and thus, the (resultant) measurements will be affected by the resistivity of the formation 112. As a result, the resistivity readings are higher than the true resistivity of the subject borehole fluid (assuming the formation resistivity is greater than the mud resistivity, a common condition in practice).

Figure 7:
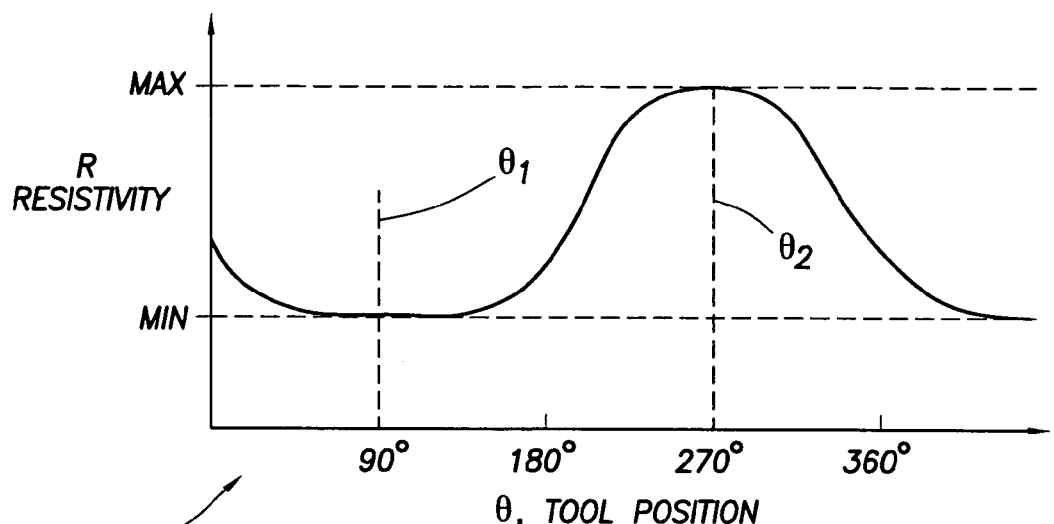
FIG. 7 is a simplified diagram representing the resistivity readings of the drilling apparatus of FIG. 6.

In summary, the resistivity measurements may vary from a minimum reading at about tool angular position $θ_1$ to a maximum reading at about tool angular position $θ_2$. At tool position $θ_1$, the resistivity measurement is derived from current traveling exclusively through the target borehole fluid, which has a higher conductivity. At tool position $θ_2$, the resistivity measurement is affected substantially by the resistivity of the formation 112 because the emitted current $θ_0$ is likely to travel through the borehole wall 112a before returning to receiving electrode $A_1$. Such varying measurements may be reflected in a resistivity log 700 as shown in FIG. 7.

Because the measurement of interest is the resistivity of the borehole fluid in the wellbore 110, it may be necessary to disregard the measurements substantially affected by the resistivity of the formation 112. These measurements are not accurate indications of the resistivity of the subject borehole fluid. In viewing the simplified resistivity log 700 of FIG. 7, these measurements or regions of the log 700 affected primarily by the formation can be readily identified and thrown out. Such a measurement in log 700 corresponds to the region about tool angular position $θ_2$ (~270°), wherein the resistivity readings are significantly higher. Furthermore, those regions corresponding to measurements which are of the subject borehole fluid only and substantially unaffected by the resistivity of the formation 112 may be extracted for analysis. These measurements are represented by the region of minimum readings in the resistivity log 700 and correspond to the region about tool angular position $θ_1$ (~90°). It should be noted that, in the prior art wherein the electrode array is circumferentially located about the entire circumference of the drill body, the resistivity readings at a given depth are merely an average of the readings of the entire region surrounding the drilling apparatus at that depth, possibly including formation readings, and not of the subject formation fluids in the wellbore. These measurements are, therefore, typically higher than the true resistivity of the formation fluid.

It is noted that wellbores may be drilled with oil-base mud fluid. These drilling fluids are emulsions that consist of oil and saline water. Under normal temperature and pressure, the saline water phase is discontinuous and the emulsion is non conductive. However, for unusual temperatures and pressures, the mud may demulsify and become conductive. When this occurs, the properties of the mud are changed, including the manner in which it invades the formation. In yet another aspect of the invention, oil-base mud demulsification may be detected with a borehole fluid resistivity measurement system, according to the invention.

Under normal conditions, these resistivity measurements of the target region will register abnormally high or non-registerable readings, because the current path between electrodes $A_0$ and $A_1$ is discontinuous. As the oil-base mud begins to demulsify, current paths begin to form, thereby registering finite or readable resistivity readings. Such readings suggest a possible demulsifying of the oil-base mud fluid, thereby serving as a warning to the operators.

Figure 8:
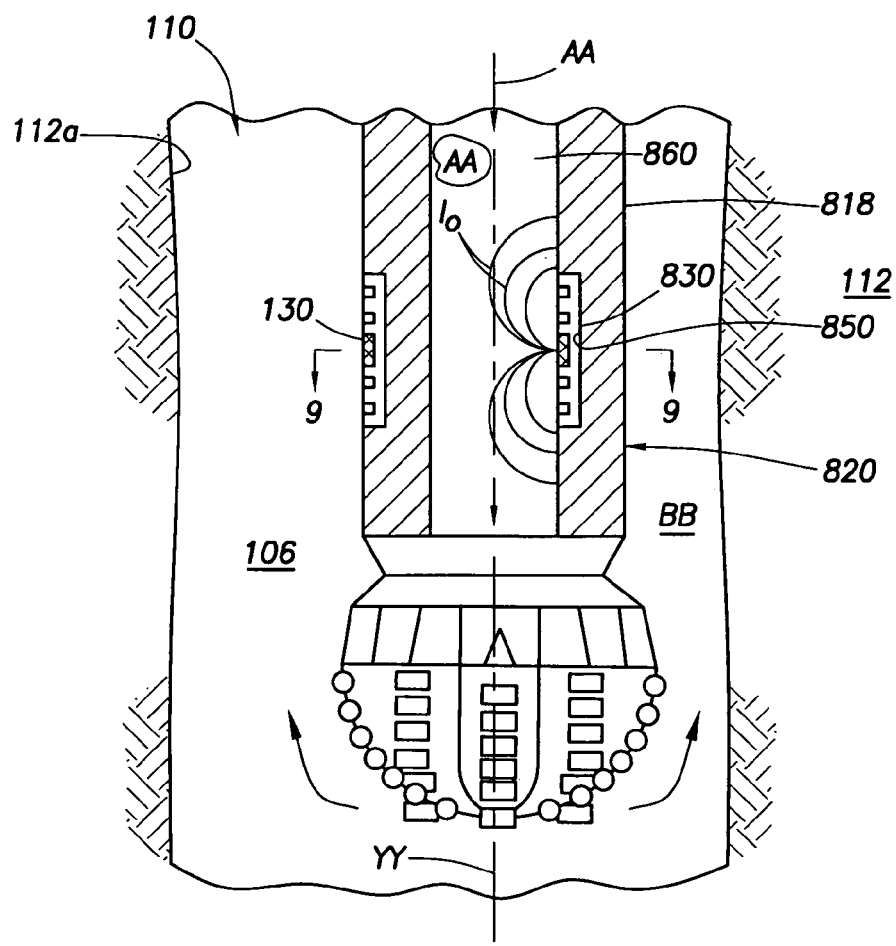
FIG. 8 is a simplified diagram of an alternative logging-while-drilling tool, according the present invention.
Figure 9:
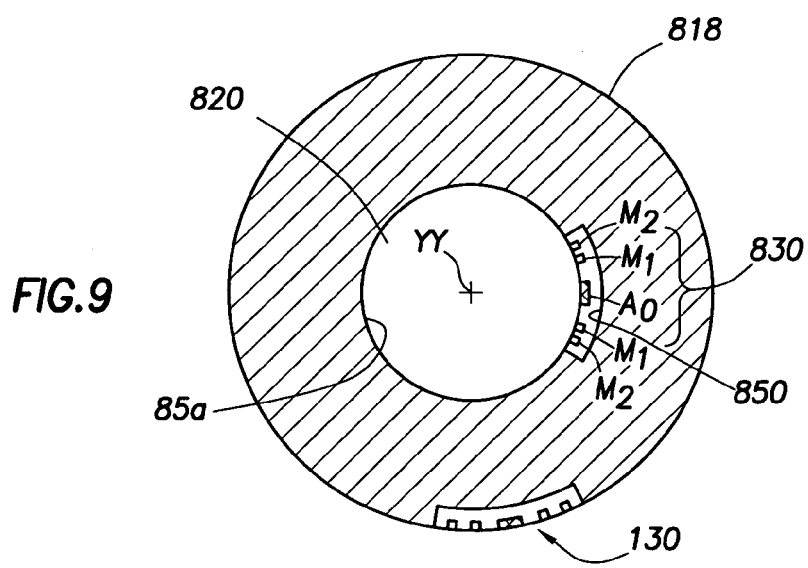
FIG. 9 is a cross sectional view through line 9—9 in FIG. 8.

FIG. 8 illustrates a further embodiment of the present invention. Specifically, FIG. 8 shows a drilling tool 818 having a first measurement system 130 or first electrode array and a second measurement system 830 or second electrode array. The first measurement system 130, for present purposes, is identical to that described above and is situated at the circumferential surface 820 of the conductive drill collar 818. Referring also to the cross-sectional view of FIG. 9, the first or external measurement system 130 is positioned to measure the resistivity of the borehole fluid BB occupying the annulus gap 106 defined between the borehole wall 112a and the drill collar 818. The second or internal measurement system 830 is positioned radially inward of the circumferential surface 820. Preferably, the electrode array comprising the second measurement system 830 is arranged similarly as that of the outside measurement system 130. The second electrode array, and more specifically, the electrodes comprising the array are, however, embedded in a concave, conductive inner surface 850 of the body of the drilling tool 818 and faces an interior passageway 860 and central axis YY. During a drilling and measurement operation in the wellbore 110, a central current emitting electrode $A_0$ of the inner measurement system 830 directs a current, $I_0$, radially inward and into the passageway 860. In this way, the second or inner measurement system conducts resistivity measurements of the drilling fluid or mud AA passing downwardly in the passageway 860.

This alternative embodiment of the present invention provides more than one discreet resistivity measurement at a given well depth and given tool angular position. One measurement is directed to the borehole fluid in the annulus gap 106 and the second measurement is directed to drilling fluid in the passageway 860. In one method according to the invention, the two resistivity measurements are compared to one another. The difference in the values of the two resistivity measurements are interpreted as a reflection of conditions within the wellbore 110. For example, a significant difference in the two resistivity measurements may be indicative of a high content of gravel constituency outside of the drilling apparatus.

In a further example, the two measurement systems are used to monitor for conditions indicative of the possibility of a high accumulation of mud cuttings in the wellbore 110. Such conditions can cause drill pipe to be stuck and the well possibly lost, and therefore, are preferably avoided. During normal drilling conditions, the resistivity of the borehole fluid in the annulus gap 106, as measured by external measurement system 130, is expected to be lower than the resistivity of the drilling fluid in the passageway 860, as measured by internal measurement system 830. A lower borehole fluid resistivity results because the borehole fluid in the annulus gap 106 elevates to a higher temperature by contacting formation 112 which is at a temperature higher than the pumped drilling fluid. Thus, the borehole fluid in annulus gap 106 is characterized by a higher temperature and a lower resistivity than the temperature and resistivity of drilling fluid passing in the passageway 860. If, during a drilling operation, a gradual increase in the relative resistivity of borehole fluid in annulus gap 106 is observed by measurement system 130 (as compared to measurements by internal measurement system 830), the cause is generally attributed to an influx of less conductive formation fluids (because of smaller concentrations of salt and/or presence of hydrocarbons) or to an accumulation of mud cuttings in the annulus gap 106. Accordingly, auxiliary measurements such as pressure and temperature in the annulus gap 106 and in the passageway 860 are used to pinpoint the cause. These measurements are used to confirm whether the downhole pressure measured in the annulus gap 106 is less than the pressure in the formation. If this cannot be confirmed, then influx of formation fluids into the wellbore 110 may be eliminated as the cause of higher resistivity readings in the annulus gap 106, and measures are taken to address possible accumulation of mud cuttings in the wellbore 110.

Figure 10:
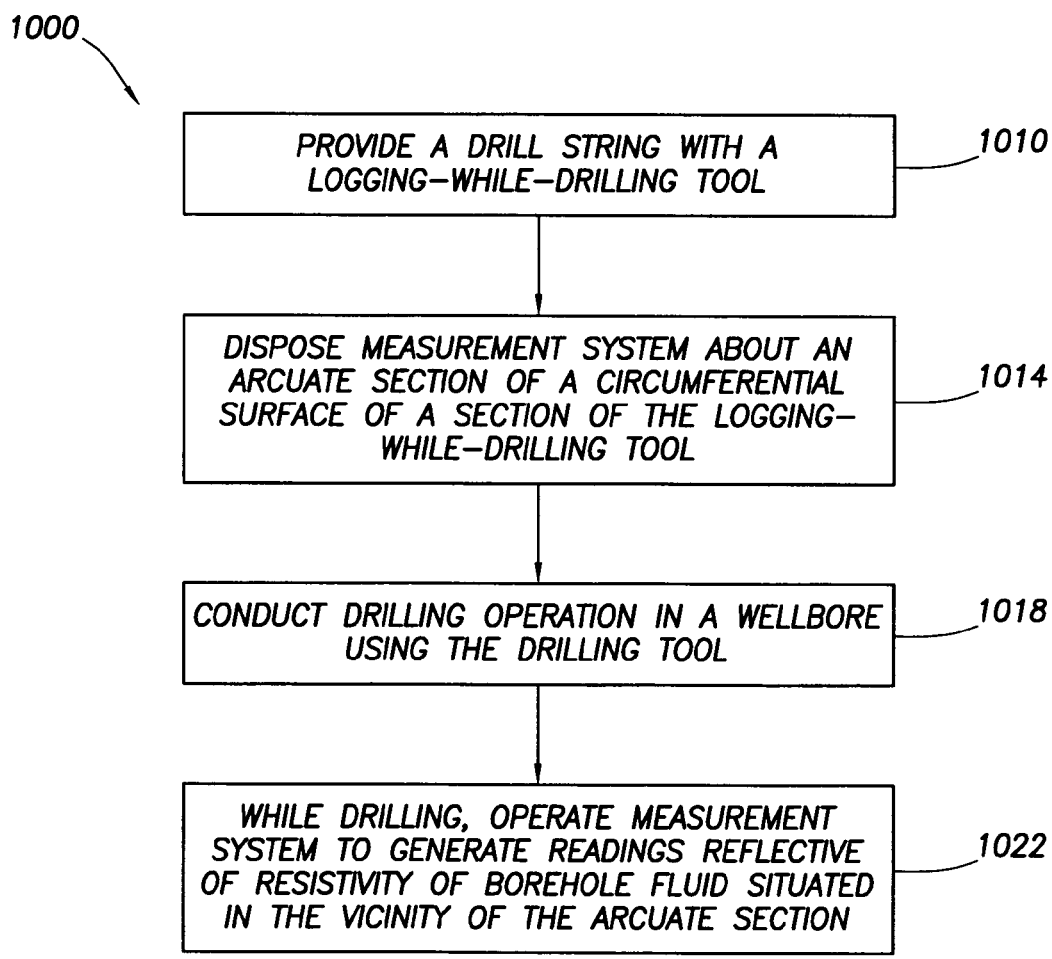
FIG. 10 is a simplified process flow chart illustrating a method of conducting borehole resistivity measurements, according to the present invention.

FIG. 10 provides a simplified flowchart 1000 representing a process of conducting borehole fluid resistivity measurements in a wellbore while drilling. First, a drill string having a logging-while-drilling tool thereon (1010) is provided. The LWD tool is provided with a borehole fluid resistivity measurement system, such as the ones described in respect to FIGS. 3–9. The measurement system is disposed about an arcuate section of a circumferential surface of a section of the LWD tool (1014). Preferably, this arcuate section is less than 180° more preferably, less than 90°, and most preferably, less than 30° of the circumference of the drilling tool. In this way, the emitted current lines and thus, the measurement at any given time, is directed to and concentrated to a localized region of the borehole. The advantages of these capabilities are discussed above.

Subsequently, the drilling operation is conducted in the wellbore utilizing the drilling tool (1018). A generally vertical wellbore may be drilled, but, in a further aspect of the invention, the drilling tool may also be operated in a deviated wellbore. The measurement system according to the invention is suited for generating readings of resistivity measurements during drilling of either types or sections of wellbores. Furthermore, while drilling, the method requires the step of operating the measurement system (1022) to conduct measurements in the wellbore. Specifically, the measurement system is operated to generate readings reflective of the resistivity of borehole fluids situated in the wellbore. These readings are advantageously made in or of borehole fluids in the vicinity of the arcuate section, as opposed to borehole fluids all around the drilling tool.

Preferably, the present inventive method of conducting borehole fluid resistivity measurements entails rotating the drilling tool (and thus, the measurement system) during drilling. In this way, the arcuate section is also rotated and makes resistivity measurements at various tool positions (relative to the borehole wall) for a given depth. In this way, more accurate resistivity readings may be achieved. For example, when the drilling tool is positioned eccentrically in the wellbore (as is likely to occur during drilling of a deviated section of wellbore), measurement readings affected by the resistivity of the formation can be readily identified and disregarded.

The apparatus and methods of the present invention provide significant advantages over the current and prior art. The present invention has been described in connection with the preferred embodiments which are, in this case, associated with a logging while drilling apparatus. However, the present invention should not be limited to the specific methods and specific structures described herein. Changes, variations, and modifications to the basic and preferred designs described herein may be made without departing from the inventive concepts in this present invention. For example, the electrode array may be arranged differently and may be disposed on different parts of the drill string or drill tool. Additionally, these changes, variations, and modifications will be obvious to those skilled in the art having the benefit of the foregoing teachings. All such changes, variations, and modifications are therefore intended to be within the scope of this present invention and, which is limited only by the following claims.

What is claimed is:

1. A logging-while-drilling tool adapted for incorporation with a drill string having a longitudinal axis, the drill string being adapted for drilling of a wellbore penetrating a geological formation and the wellbore having an all-around wall, said drilling tool comprising:
   a tool body having a central axis disposed in generally parallel relation with the longitudinal axis of the drill string and a circumferential surface spaced radially outward from said central axis; and
   a measurement apparatus for measuring resistivity of a borehole fluid in the wellbore, said measurement apparatus having an electrode array including
      a current emitting electrode disposed on said circumferential surface, said current emitting electrode being adapted to emit current into a target region of the wellbore spaced laterally between said circumferential surface and the wall of the wellbore; and
      a current receiving electrode disposed on said circumferential surface and spaced apart from said current emitting electrode, said current receiving electrode being adapted to receive current propagated from said current emitting electrode into the target region, wherein said electrode array occupies an arcuate section of said circumferential surface, wherein said electrode array is configured such that rent emitted from said current emitting electrode and received by said current receiving electrode traverses a current path through the target region that has a lateral or circumferential component that extends less than about 180° about said central axis.

2. The tool of claim 1, further comprising a pair of spaced-apart voltage electrodes disposed on said circumferential surface and positioned between said current emitting electrode and said current receiving electrode, said voltage electrodes being measurable for a voltage difference reflective of the resistivity of the target region.

3. The tool of claim 2, wherein said arcuate section extends less than about 180° about said central axis.

4. The tool of claim 2, wherein each said voltage electrode has a closed loop shape, such that said voltage electrodes are disposed about said current emitting electrode and one of said voltage electrodes is disposed about said other voltage electrode.

5. The tool of claim 1, wherein said arcuate section extends less than about 90° about said central axis.

6. The tool of claim 1, wherein said arcuate section extends less than about 30° about said central axis.

7. The tool of claim 1, wherein said circumferential surface is a conductive surface, said current receiving electrode being formed by at least a portion of said conductive surface.

8. The tool of claim 1, wherein each of said electrodes extends circumferentially on said circumferential surface less than about 45° about said central axis.

9. The tool of claim 1, wherein said current receiving electrode is spaced longitudinally from said current emitting electrode.

10. The tool of claim 1, wherein the drill string has a central annulus extending therethrough and including an annulus portion extending longitudinally through said tool body, said annulus portion being adapted for communicating drilling fluid and the like, said tool further comprising:
    a second measurement system disposed on an inner surface of said tool body extending about said central axis and said annulus portion, said second measurement system being adapted to measure resistivity of fluid passing through said annulus portion and including an inner current emitting electrode and an inner current receiving electrode, said inner electrodes being disposed on said inner surface and operable to generate a current path through said annulus.

11. A method of measuring a resistivity of borehole fluid in a wellbore during drilling of the wellbore, said method comprising the steps of:
    lowering a measurement apparatus into the wellbore along with a drilling apparatus, wherein the measurement apparatus includes
       a generally longitudinally extending circumferential surface,
       a current emitting electrode disposed on the circumferential surface, and
       a current receiving electrode disposed on the circumferential surface and spaced apart from the current emitting electrode, the current receiving electrode being adapted to receive current propagated from the current emitting electrode, wherein an electrode array including the current electrodes occupies an arcuate section of the circumferential surface;
    during drilling, emitting a current from the current emitting electrode into a target region spaced laterally between the wall of the wellbore and the circumferential surface;
    during drilling, receiving, at the current receiving electrode, current emitted by the current emitting electrode into the target region, whereby the target region traversed by the emitted current extends less than 360° about said central axis;
    during drilling, measuring a voltage difference that is reflective of the resistivity of borehole fluid in the target region; and
    rotating the measurement apparatus in the wellbore through a range of 360°, whereby the emitting receiving and measuring steps are repeated a plurality of times during the 360° rotation to generate measurements corresponding to a plurality of angular tool positions; and
    wherein during said rotating step, the drilling apparatus is eccentered in the wellbore, and said repeated emitting, receiving, and measuring steps include performing said steps at a first angular position whereby the arcuate section is spaced from the borehole wall a minimum distance and at a second angular position wherein the actuate section is spaced a maximum distance from the borehole wall.

12. The method of claim 11, further comprising the step of identifying measurements corresponding to the second angular position and recording the corresponding measurement as a borehole fluid resistivity measurement.

13. The method of claim 11, wherein the measurement apparatus includes a pair of spaced-apart electrodes disposed between the current electrodes, said measuring step including measuring the voltage between the pair of voltage electrodes to indicate resistivity of the target region.

14. The method of claim 11, wherein said arcuate section extends less than about 30° about said central axis, and wherein said measuring step includes measuring the voltage difference between two voltage electrodes of the electrode array that are disposed in the arcuate section.

15. A measurement apparatus for measuring a resistivity of borehole fluid in a target region of a wellbore, said measurement apparatus comprising:
   a tool body having a central axis disposed in generally parallel relation with a longitudinal axis of the wellbore when said tool body is lowered into the wellbore, said tool body having an external, circumferential surface spaced radially outward from said central axis;
   a current emitting electrode disposed on said circumferential surface, said current emitting electrode being adapted to emit current into a target region spaced laterally between said circumferential surface and the wall of the wellbore; and
   a current receiving electrode disposed on said circumferential surface and spaced apart from said current emitting electrode, said current receiving electrode being adapted to receive current propagated from said current emitting electrode into the target region, wherein said electrodes are configured such that a circumferential span between said electrodes in the direction of a current path generated between the two electrodes extends less than about 180° about the central axis.

16. The apparatus of claim 15, further comprising a pair of spaced-apart electrodes disposed on said circumferential surface and positioned between said current emitting electrode and said current receiving electrode, said voltage electrodes being measurable for a voltage difference reflective of the resistivity of the target region.

17. The apparatus of claim 16, wherein said electrodes are disposed on an arcuate section of said circumferential surface, said arcuate section extending less than about 90° about said central axis.

18. The apparatus of claim 16, wherein each said voltage electrode has a closed loop shape, such that said voltage electrodes are disposed about said current emitting electrode and one of said voltage electrodes is disposed about said other voltage electrode.

19. The apparatus of claim 15, wherein said current receiving electrode is disposed about said current emitting electrode.

20. The apparatus of claim 19, wherein said circumferential surface is a conductive surface, said current receiving electrode being formed from at least a portion of said conductive surface.

21. The apparatus of claim 15, wherein each of said electrodes extends circumferentially on said circumferential surface less than about 90° about said central axis.

22. The apparatus of claim 15, wherein said circumferential span extends less than about 30° about said central axis.

23. The apparatus of claim 15, wherein said arcuate section extends less than about 20° about said central axis.

24. The apparatus of claim 15, wherein said tool body is adapted for connection with a drilling apparatus of a drill string.

* * * * *